US005269865A

United States Patent [19]

Kushida et al.

[11] Patent Number: 5,269,865

[45] Date of Patent: Dec. 14, 1993

[54] THERMAL TRANSFER MATERIAL AND THERMAL TRANSFER RECORDING METHOD

[75] Inventors: Naoki Kushida; Yasuyuki Tamura, both of Yokohama; Takayuki Suzuki, Saitama; Koichi Tohma, Tachikawa; Masanobu Asaoka, Yokohama, all of Japan

[73] Assignee: Canon Kabushiki Kaisha, Tokyo, Japan

[21] Appl. No.: 931,407

[22] Filed: Aug. 24, 1992

Related U.S. Application Data

[63] Continuation of Ser. No. 620,398, Nov. 30, 1990, abandoned, which is a continuation of Ser. No. 276,021, Nov. 25, 1988.

[30] Foreign Application Priority Data

| | | | |
|---|---|---|---|
| Nov. 26, 1987 | [JP] | Japan | 62-299046 |
| Jul. 7, 1988 | [JP] | Japan | 63-170552 |

[51] Int. Cl.⁵ .......................... B32B 31/00; B41J 2/45

[52] U.S. Cl. .................................... 156/234; 156/235; 156/240; 156/241; 400/120; 400/696; 428/913; 428/488.4

[58] Field of Search ............... 156/240, 234, 235, 241; 400/696, 120 MT, 695, 697.1, 697; 428/913, 488.4; 427/412.4

[56] References Cited

U.S. PATENT DOCUMENTS

| | | | |
|---|---|---|---|
| 4,087,574 | 5/1978 | Yamaguchi et al. | 427/412.5 X |
| 4,235,657 | 11/1980 | Greenman et al. | 156/240 X |
| 4,453,839 | 6/1984 | Findlay et al. | 428/913 X |
| 4,684,271 | 8/1987 | Wellman et al. | 400/120 |
| 4,739,338 | 4/1988 | Tanaka et al. | 400/120 |
| 4,748,151 | 5/1988 | Murata et al. | 428/195 X |
| 4,834,567 | 5/1989 | Ueno et al. | 400/697.1 |
| 4,875,961 | 10/1989 | Oike et al. | 156/240 X |
| 4,883,379 | 11/1989 | Fukuda et al. | 427/264 X |
| 4,960,632 | 10/1990 | Tohma et al. | 428/488.4 X |
| 5,120,383 | 6/1992 | Takei et al. | 156/240 |

FOREIGN PATENT DOCUMENTS

| | | | |
|---|---|---|---|
| 208385 | 1/1987 | European Pat. Off. | 428/195 |
| 58-74368 | 4/1983 | Japan | 428/195 |
| 61-23992 | 1/1986 | Japan | 428/195 |
| 62-156993 | 11/1987 | Japan | 428/195 |

OTHER PUBLICATIONS

The Merck Index, 11th ed., p. 1059, 1989.

*Primary Examiner*—David A. Simmons
*Assistant Examiner*—Chester T. Barry
*Attorney, Agent, or Firm*—Fitzpatrick, Cella, Harper & Scinto

[57] ABSTRACT

There are provided a "self-correctable" thermal transfer material and a thermal transfer recording method using the transfer material. The thermal transfer material comprises a support, a first ink layer, a second ink layer and a third ink layer disposed in this order on the support, wherein the first ink layer is a substantially non-transferable layer, the second ink layer is capable of causing separation from the first ink layer on heating; and the third ink layer comprising a thermoplastic resin and a colorant. A recorded image formed by the above-mentioned transfer material can be removed through lift-off correction, by causing the transfer material to adhere to the recorded image under heating, and separating the transfer material from the recording medium without causing separation of the second ink layer.

20 Claims, 2 Drawing Sheets

THERMAL TRANSFER MATERIAL AND THERMAL TRANSFER RECORDING METHOD

This application is a continuation of application Ser. No. 620,398 filed Nov. 30, 1990, now abandoned, which was a continuation of application Ser. No. 276,021 filed Nov. 25, 1988.

FIELD OF THE INVENTION AND RELATED ART

The present invention relates to a thermal transfer material for use in a thermal transfer recording method capable of providing a recorded image of good quality, which is removable by a lift-off correction, on a recording medium having a low surface smoothness, and also relates to a thermal transfer recording method using the thermal transfer material.

The thermal or heat-sensitive transfer recording method has recently been widely used because it has general advantages of the thermal recording method such that the apparatus employed is light in weight, compact, free of noise, excellent in operability and adapted to easy maintenance, and also has other advantages such that it does not require a color-formation type converted paper but provides recorded images with excellent durability.

However, the thermal transfer recording method still involves some drawbacks to be remedied. One of the drawbacks is that it can provide only a relatively poor image on a recording medium (or a medium to be transfer-printed) with a low surface smoothness such as paper. Another drawback is that a transfer-recorded image is not easily erased if it is recorded erroneously.

As a general method for correction of erroneously recorded images or error images in general, it may be conceived to use a correcting paint which has been widely used in recent years. Especially in the thermal transfer recording, it has also been proposed to use a thermal transfer material having a thermal transfer ink layer containing a correcting colorant of substantially the same color as the recording medium and to cover an error image with the transfer ink layer. It is however difficult to use a colorant having exactly the same color as the recording medium, and the corrected portion is liable to become somewhat convex by coverage with the ink layer and is readily noticeable to provide an undesirable appearance.

As correction methods free from such difficulties, there have been proposed a method of peeling through adhesion of an erroneously recorded image on a recording medium by using a heat-sensitive adhesive tape, (i.e., so-called "lift-off correction" method). However, such correction method requires both a thermal transfer material for providing a transferred image on a recording medium, and a correction sheet for erasing the transferred image, and a thermal transfer printer therefor requires a change mechanism for changing the tapes for printing and correction with each other. As a result, the printer undesirably becomes larger and the structure thereof becomes more complex.

In order to solve the above-mentioned problem, there has been proposed a "self-correctable" (or self-correcting) thermal transfer material which not only can provide a transfer-recorded image but also can conduct the lift-off correction by itself.

For example, Japanese Laid-Open Patent Application (KOKAI) No. 74368/1983 discloses a heat-sensitive laminate material which comprises a resistance support and an active layer disposed thereon, and is capable of both recording and correction. The above-mentioned active layer is so constituted that it develops adhesion and can erase the transfer-recorded image by peeling the image, when it is heated up to a temperature lower than that for recording.

Further, Japanese Laid-Open Patent Application No. 23992/1986 discloses a thermal transfer material comprising a support and a layer disposed thereon which comprises a colorant, a binder, and heat-sensitive adhesive material having a higher softening point than that of the binder. In this Application, a transferred image is formed by applying a low thermal energy to the thermal transfer material by using a thermal head as a heat source, and an erroneously transferred image is peeled and erased by applying thereto a higher energy than that for recording.

However, there has not been obtained a thermal transfer material which not only provides a transferred image of good quality even on a recording medium with a low surface smoothness but also satisfies a self-correcting function, and therefore the development of such thermal transfer material is desired.

In the case of the conventional self-correctable thermal transfer material, particularly when an error image printed on a recording medium with a low surface smoothness is peeled by such thermal transfer material, correction is only incompletely performed in many cases because only a portion of an error image formed on a convexity is peeled to leave a portion of the image formed in a concavity unpeeled.

Japanese Laid-Open Patent Application No. 156993/1987 discloses a self-correctable thermal transfer material which comprises a support and a separation layer disposed thereon having a relatively low melt viscosity. It is necessary that the material constituting the separation layer does not deteriorate in storage and have a low viscosity. However, because such material generally tends to be hard and brittle, the whole ink layer disposed on the support is liable to be peeled therefrom when the thermal transfer material is used for the lift-off correction. As a result, such thermal transfer material has disadvantages that there is little latitude in the using condition such as energy to be applied to the thermal transfer material, and that the correction thereby is liable to be incomplete. In order to solve these problems, it is necessary to use a component having a high melt viscosity in the separation layer. In such case, however, a large force is required in order to effect recording, whereby a recorded image having many image defects is liable to be formed on a recording medium with a low surface smoothness.

SUMMARY OF THE INVENTION

A principal object of the present invention is to solve the above-mentioned problems encountered in the prior art and to provide a thermal transfer material which is capable of giving transferred images of high density and clear edges without transfer defects, not only on a recording medium having good surface smoothness but also on a recording medium having poor surface smoothness and is capable of erasing the transferred image by lift-off correction.

Another object of the present invention is to provide a thermal transfer recording method using the above-mentioned thermal transfer material.

According to the present invention, there is provided a thermal transfer material comprising: a support, a first ink layer, a second ink layer and a third ink layer disposed in this order on the support, the first ink layer being a substantially non-transferable layer capable of adhering to the support on heating; the second ink layer being capable of causing separation from the first ink layer on heating; the third ink layer comprises a thermoplastic resin and a colorant.

The present invention also provides a thermal transfer recording method, comprising:

providing a thermal transfer material which comprises a support, a first ink layer, a second ink layer and a third ink layer disposed in this order on the support;

superposing the transfer material on a recording medium so that the third ink layer faces the recording medium;

heating the transfer material in a pattern;

separating the transfer material from the recording medium immediately after the transfer material is heated and before the second ink layer restores its cohesive strength before heating, thereby to cause separation of the second ink layer from the first ink layer and to leave a recorded image on the recording medium;

causing the transfer material again to adhere to the recorded image under heating; and separating the transfer material from the recording medium without causing separation of the second ink layer, thereby to peel the recorded image from the recording medium toward the transfer material.

These and other objects, features and advantages of the present invention will become more apparent upon a consideration of the following description of the preferred embodiments of the present invention taken in conjunction with the accompanying drawings. In the following description, "%" and "parts" representing quantity ratios are by weight unless otherwise noted specifically.

DETAILED DESCRIPTION OF THE INVENTION

Figure 1:
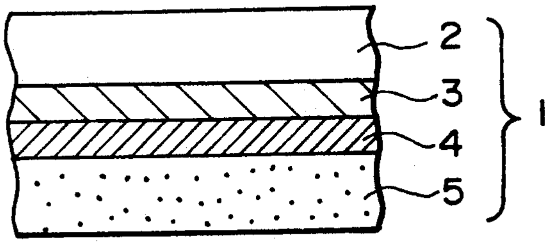
FIGS. 1 and 2 are schematic views each showing a section across the thickness of an embodiment of the thermal transfer material according to the present invention.

Referring to FIG. 1, the thermal transfer material 1 according to the present invention comprises a support 2, a first ink layer 3, a second ink layer 4, and a third ink layer 5, disposed in this order on the support.

In the present invention, the first ink layer 3 is so constituted that it has strong adhesion to the support 2 without causing separation therein or at the interface between it and the support 2, even at the time of recording under heating. Namely, the first ink layer 3 is substantially non-transferable layer such that it is not completely melted, even if it is softened, on heating so as to avoid a decrease in adhesion with the support 2, and not to be substantially transferred to a recording medium side when the thermal transfer material is superposed on a recording medium.

The second ink layer 4 causes separation therein or at the interface between it and the first ink layer 3 at the time of recording under heating, thereby to facilitate the transfer of the third ink layer 5 to a recording medium. However, because the non-heated portion of the second ink layer 4 is not melted or softened, it is strongly bonded to the first ink layer 3 and the third ink layer 5 in the non-heated portion to suppress the transfer of the third ink layer 5 to the recording medium. Particularly, such contrast between the heated and non-heated portions has much effect on the edge clearness of the resultant transferred image.

In a thermal transfer recording method using the thermal transfer material 1 of the present invention, the thermal transfer material is superposed on a recording medium such as plain paper and is heated in a pattern, e.g., by using a thermal head. When the thermal transfer material 1 is peeled from the recording medium immediately after the thermal transfer material is heated in a pattern and before the strength of the second ink layer 4 becomes sufficiently large, separation occurs in the second ink layer 4, whereby a recorded image is formed on the recording medium.

On the other hand, when the thermal transfer material 1 is caused to contact the recorded image formed on the recording medium and is heated, and then the thermal transfer material 1 is peeled from the recording medium after the strength of the second ink layer 4 becomes sufficiently large, the recorded image formed on the recording medium is peeled and removed from the recording medium.

In the present invention, the first ink layer 3 disposed between the support 2 and the second ink layer 4 enhances the adhesion between the support 2 and the whole ink layers and enables desirable lift-off correction. The function of the first ink layer 3 may be considered as follows.

The support used in a thermal transfer material generally comprises a plastic film in many cases. Such plastic film is generally subjected to uniaxial or biaxial stretching (or orientation) treatment so that the resultant film satisfies various properties such as heat-resistance, tensile strength, elongation, and tear strength. Accordingly, the molecular chains constituting the film are oriented or aligned in a prescribed direction. As a result, there is sometimes a case where the above-mentioned properties are enhanced to a satisfactory degree but another property such as adhesion property of the film surface deteriorates. For example, a polyester film generally has a poor adhesion property and it is extremely liable to cause adhesion failure such as peeling of an ink layer when there is formed thereon an ink layer (such as the second ink layer 4) which predominantly comprises a sharply meltable material having a low melt viscosity.

Accordingly, when the conventional thermal transfer material without a lift-off correction function is subjected to a lift-off correction, an erroneously recorded image cannot be peeled to the thermal transfer material side but there occurs separation at the interface between the ink layer and the support, whereby the ink layer of the thermal transfer material is transferred to the recording medium, i.e., so-called "reverse transfer" occurs.

In the present invention, however, the first ink layer 3 having an adhesive function is formed on the support 2 such as a plastic film, e.g., by a coating method. Because molecular chains constituting the coating layer are generally oriented randomly, the adhesion property between the second ink layer 4 and the support 2 is improved, thereby to avoid the above-mentioned peeling of the ink layer. Particularly, when the first ink layer predominantly comprises a component having a low glass transition temperature, the flexibility of the first ink layer is enhanced to suppress the peeling thereof from the support, whereby the above-mentioned reverse transfer is suppressed in the case of the lift-off correction. Further, the first ink layer 3 is caused to have a flexibility, the third ink layer 5 may preferably follow the unevenness of an error image and ensure a sufficient contact therewith.

For this purpose, the first ink layer 3 may preferably comprise a thermoplastic resin so as to show a large cohesion and also a large adhesion to the support under heating. It is preferred that the thermoplastic resin constituting the first ink layer 3 may preferably have a glass transition temperature of −40° C. to 30° C., more preferably −30° C. to 15° C., particularly −18° to 15° C. In case where the thermoplastic resin is a mixture of plural (n) thermoplastic resins, it is preferred that the glass transition temperature $T_{gM}$ of the mixture defined by the following equation (A) is also within the above-defined range:

$$T_{gM}=T_{g1}\times w_1/W+T_{g2}\times w_2/W+\ldots+T_{gn}\times w_n/W \quad (A),$$

wherein $T_{g1}, \ldots T_{gn}$ denote the glass transition temperature of individual thermoplastic resins constituting the thermoplastic resin mixture; W denotes the total weight of the thermoplastic resin mixture; and $w_1, \ldots w_n$ denote the weights of the individual thermoplastic resins constituting the thermoplastic resin mixture. In other words, in the case where a mixture of plural resins is used as the thermoplastic resin, the thermoplastic resin mixture may be regarded as a single thermoplastic resin if the glass transition temperature of the mixture is defined by the above equation (A). If the glass transition temperature of the thermoplastic resin is too high, the first ink layer 3 loses its flexibility and is caused to have a low adhesion with the support. If the glass transition temperature is too low, the first ink layer becomes too viscous, thus causing a difficulty in handling in the production thereof.

Further, the first ink layer 3 may preferably show a large cohesion strength. For a high cohesion strength, it is preferred that the weight-average molecular weight of the thermoplastic resin constituting the first ink layer 3 is 10,000 or more, particularly 50,000 or more. The weight-average molecular weight used herein refers to a value measured by GPC (gel permeation chromatography). When the thermoplastic resin is a mixture of plural thermoplastic resins, the weight-average molecular weight refers to that of the thermoplastic resin mixture as a whole.

The thermoplastic resin used in the first ink layer 3 may for example be vinyl acetate-type resin such as vinyl acetate-ethylene copolymer, epoxy-type resin, polyurethane-type resin, acrylic resin, or elastomer such as styrene-butadiene rubber and isoprene rubber. Among these, there may particularly preferably be used vinyl acetate-ethylene copolymer, polyurethane-type resin, acrylic resin, or polyester-type resin. Further, petroleum resin, phenolic resin, melamine-type resin, urea-type resin, or polystyrene-type resin can be further mixed as desired. It is also possible to admix a filler, such as titanium oxide, clay, zinc white or alumina hydrate; a plasticizer, a stabilizer, etc., as desired.

The first ink layer 3 may be obtained through appropriate control of the molecular weight and/or crystallinity of the above-mentioned material and/or through mixing of plural species thereof.

It is preferred for the thermoplastic resin constitutes 70–100%, particularly 90–100%, of the first ink layer 3.

Incidentally, the first ink layer can be melted at the time of recording under heating, unless it inhibits the separation due to the second ink layer 4 at the time of recording. The melt viscosity, particularly the viscosity at 150° C., of the first ink layer 3 may preferably be 5,000 cps or larger, more preferably 10,000 cps or larger.

The second ink layer 4 may preferably be one which can sharply be melted or can provide a decrease in adhesion at the interface thereof with the first ink layer 3 or the third ink layer 5, under heating. The first ink layer 3 and/or the third ink layer 5 may preferably have a large cohesion under heating, and may preferably comprise a relatively large amount of a thermoplastic resin. Accordingly, in view of the sharp-melting property or the decrease in adhesion at the interface, the second ink layer 4 may preferably have a melting point of 50° C. or above, and may preferably have a melt viscosity of 500 cps or below at 150° C. The second ink layer 4 may preferably comprise a material as described below, particularly a wax.

Example of the above-mentioned wax may include natural waxes including vegetable waxes such as carnauba wax, candelilla wax, rice wax, and haze wax; mineral waxes such as ceresine wax, montan wax and derivatives of these (e.g., derivatives of montan wax including acid wax, ester wax and partially saponified ester wax); and petroleum waxes such as paraffin wax ,and microcrystalline wax. Further, there can be used synthetic waxes including polyethylene wax (particularly, low-molecular weight oxidized polyethylene), and Fischer-Tropsch wax. The above-mentioned wax may preferably constitutes 80% or more, more preferably 90% or more, of the second ink layer 4. These waxes may be used singly or as a mixture so as to satisfy the above-mentioned melting point and melt viscosity.

The second ink layer 4 may preferably have a melt viscosity of 200 cps or below, more preferably 100 cps or below, at 150° C. In view of the above-mentioned conditions and sharp-melting property, there may particularly preferably be used carnauba wax, or paraffin wax. When the above-mentioned carnauba waxes or paraffin wax constitutes 40% or more, more preferably 50% or more, of the total wax component constituting the second ink layer 4, the above-mentioned characteristics may also be satisfied sufficiently.

Incidentally, the melt viscosity used in the present invention refers to a value measured by a rotary viscometer (Model: Rotovisco RV 12, mfd. by Haake Co., West Germany) using a cone (PKI 0.3 degree) of stainless steel with a diameter of 28 mm, as a rotor.

In order to form the second ink layer 4, it is possible to admix a filler, such as titanium oxide, clay, zinc oxide or alumina hydrate; a plasticizer, a surfactant, a stabilizer, etc., with the above-mentioned wax as desired.

The third ink layer 5 has a function of providing a transferred image erasable by a lift-off correction method, even on a recording medium having a low surface smoothness. The third ink layer 5 may preferably comprise a heat-fusible material as a main component, and may optionally comprise a colorant, a dispersing agent, plasticizer, oil, filler, etc.

As the third ink layer 5 comprises a thermoplastic resin, it may be transferred to a recording medium with a low surface smoothness so as to bridge convexities of the recording medium surface, whereby a transferred image without transfer defect or image deformation having good wear resistance may be obtained. The thermoplastic resin may preferably constitute 50% or more, more preferably 70% or more, of the third ink layer 5. In order to obtain good transferability to a recording medium having a low surface smoothness, there may preferably be used a thermoplastic resin having a high cohesion and a high molecular weight.

In order to obtain good transferability to a recording medium having a low surface smoothness, the third ink layer may preferably have a melt viscosity of 600 cps or larger, more preferably 1,000 cps or larger, particularly 5,000 cps or larger, at 150° C.

Further, the melting point of the third ink layer 5 measured by a differential scanning calorimeter (DSC) (hereinafter, the melting point used in the present invention is that measured by DSC) is not particularly restricted, but the melting point may preferably be 50°-200° C., more preferably 70°-150° C. In the above-mentioned measurement of the melting point, Perkin-Elmer Seven Series Thermal Analysis System, and a temperature increasing rate of 5° C./min. are used, and an endothermic peak is observed. If the melting point exceeds 200° C., there may be posed problem of heat-resistance of the support whereby the kinds thereof may extremely be limited. Further, the durability of a thermal head may undesirably be lowered. If the melting point is lower than 50° C., non-selective transfer is undesirably liable to occur, even when a resin-type heat-fusible material is used.

Examples of heat-fusible material constituting the third ink layer 5 include: polyolefin resins, polyamide resins, polyester resins, epoxy resins, polyurethane resins, acrylic resins, polyvinyl chloride resins, cellulose resins, polyvinyl alcohol resins, petroleum resins, phenolic resins, styrene resins, and vinyl acetate resins; elastomers such as natural rubber, styrene-butadiene rubber, isoprene rubber, chloroprene rubber and the like; and polyisobutylene, polybutene. These components may be used singly or as a mixture. It is particularly preferred to use as a predominant component (i.e., a component constituting 50% or more of the heat-fusible material) in the third ink layer, a resin or polymer component predominantly comprising an olefin, such as ethylene-vinyl acetate copolymer, vinyl acetate-ethylene copolymer, ethylene-acrylic acid copolymer, ethylene-methacrylic acid copolymer, ethylene-acrylic acid ester copolymer, or polyamide, polyester, etc.

Such heat-fusible material may appropriately be mixed, as desired, with a material other than resin, including: natural waxes such as whale wax, beeswax, lanolin, carnauba wax, candelilla wax, montan wax, ceresin wax and the like; petroleum waxes such as paraffin wax and microcrystalline wax; synthetic waxes such as oxidized wax, ester wax, low-molecular weight polyethylene, Fischer-Tropsch wax and the like; higher fatty acids such as lauric acid, myristic acid, palmitic acid, stearic acid, behenic acid and the like; higher alcohols such as stearyl alcohol, behenyl alcohol and the like; esters such as fatty acid esters of sucrose, fatty acid esters of sorbitan and the like; amides such as oleic amide and the like; plasticizers, oils such as mineral oils or vegetable oils. The heat-fusible material may preferably be selected to provide a third ink layer 5 having a melting point in the range of 50° to 200° C.

In the thermal transfer material of the present invention, various dyes or pigments generally used in the field of printing and recording may be used as the colorant. The colorant is contained at least in the third ink layer 5. The colorant content may suitably be in the range of 3-60% based on the total weight of the first, second and third ink layers. Particularly, the third ink layer 5 may preferably contain 3-80%, more preferably 5-60% thereof of the colorant. Further, the third ink layer 5 may optionally comprise a dispersing agent or filler comprising metal fine powder, inorganic fine powder, metal oxide fine powder, etc.

Specific examples of the colorant used in the thermal transfer material of the present invention may include one or more of known dyes or pigments such as carbon black, Nigrosin dyes, lamp black, Sudan Black SM, Fast Yellow G, Benzidine Yellow, Pigment Yellow, Indo Fast Orange, Irgadine Red, Paranitroaniline Red, Toluidine Red, Carmine FB, Permanent Bordeaux FRR, Pigment Orange R, Lithol Red 2G, Lake Red C, Rhodamine FB, Rhodamine B Lake, Methyl Violet B Lake, Phthalocyanine Blue, Pigment Blue, Brilliant Green B, Phthalocyanine Green, Oil Yellow GG, Zapon Fast Yellow CGG< Kayaset Y963, Kayaset YG, Smiplast Yellow GG, Zapon Fast Orange RR, Oil Scarlet, Smiplast Orange G, Orasol Brown G, Zapon Fast Scarlet CG, Aizen Spiron Red BEH, Oil Pink OP, Victoria Blue F4R, Fastgen Blue 5007, Sudan Blue, and Oil Peacock Blue.

In the above-mentioned embodiment of the present invention, the third ink layer 5 has a monolayer structure comprising one ink layer which comprises the above-mentioned heat-fusible material and colorant, and an optional additive such as a dispersing agent, plasticizer and filler. However, the structure of the third ink layer is not particularly restricted to such one-layer structure. More specifically, the third ink layer 5 may be function-separated into two layers including a layer having a function of exerting an adhesion on a recording medium when heated by means of a thermal head, and a layer having a function of coloring. Further, the third ink layer may comprise three or more layers.

Figure 2:
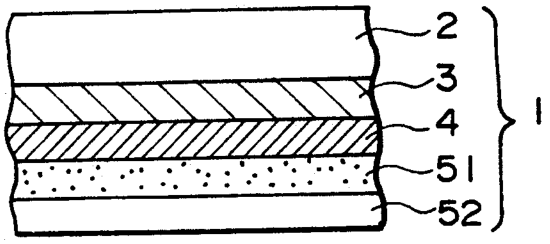

Hereinbelow, there is described an embodiment wherein the third ink layer 5 comprises two layers as shown in FIG. 2. In this embodiment, the thermal transfer material 1 comprises a support 2, a first ink layer 3, a second ink layer 4, a third ink layer 51 and a fourth ink layer 52, disposed in this order on the support.

In such embodiment, the third ink layer 51 fulfills a coloring function, and the fourth ink layer 52 fulfills a function of controlling the adhesiveness of the heated portion to the paper. Both of the third and fourth ink layers 51 and 52 have an appropriate film strength under heating similarly as in the third ink layer 5 shown in FIG. 1, and they may be transferred to a recording medium with a low surface smoothness so as to bridge convexities of the recording medium surface.

As the material constituting the third ink layer 51 and the fourth ink layer 52, that constituting the third ink layer 5 shown in FIG. 1 may be used as such. With respect to each of the third and fourth ink layers 51 and 52, a thermoplastic resin may preferably constitute 50% or more, more preferably 70% or more, of each ink layer. The third and fourth ink layers 51 and 52 may preferably have a melt viscosity of 600 cps or larger, more preferably 1,000 cps or larger, particularly 5,000 cps or larger, at 150° C., similarly as in the third ink layer 5 in FIG. 1.

In case where the third ink layer 5 has a two-layer structure, the colorant may preferably be contained in a proportion in the range of 3–60% based on the total weight of the first, second, third and fourth ink layers. Less than 3% results in a low transferred image density, and more than 60% results in a poor transfer characteristic. Particularly, the third ink layer 51 may preferably contain 3–80%, more preferably 5–60% thereof of the colorant.

The fourth ink layer 52 may basically comprise the same material as that of the third ink layer 51 except for the colorant content, but the fourth ink layer may preferably comprise a material capable of having a large adhesion to a recording medium. Examples of such material may include one or more materials including: homopolymer or copolymer of olefin, such as polyethylene, polypropylene, polyisobutylene, ethylene-vinyl acetate copolymer, ethylene-acrylic acid copolymer, and ethylene-ethyl acrylate copolymer, or derivatives of these; heat-sensitive adhesives of polyamide, polyester, polyurethane or acrylic resin-type; and styrene-type block copolymers, such as styrene-isobutylene copolymer, styrene-butadiene copolymer, and styrene-ethylene-butylene copolymer. Further, it is possible to add a tackifier, such as alicyclic hydrocarbon, terpene, or rosin; a filler, such as talc or calcium carbonate, and a stabilizer such as an antioxidant.

The thickness of the first ink layer 3 may preferably be 0.5 micron or larger in view of the following or fitting property in the case of a recording medium having a low surface smoothness, and may preferably be 10 microns or smaller, more preferably 5 microns or smaller in view of heat conductivity.

In the present invention, the second ink layer 4 and the third ink layer 5 may preferably have a thickness in the range of 0.5 to 10 microns, further preferably 0.5 to 5 microns, respectively. In case where the third ink layer 5 has a structure of two or more layers, each layer may preferably have a thickness in the same range as described above. Further, the total thickness of the first, second and third ink layers may preferably be 2 to 20 microns, more preferably 3 to 15 microns. In a case where the third ink layer 5 is function-separated into two or more layers, the total thickness of the ink layers may preferably be 13 to 30 microns, more preferably 15 to 25 microns.

As the support 2, it is possible to use films known in the art as such. For example, films of plastics having relatively good heat-resistance such as polyester, polycarbonate, triacetylcellulose, polyamide, polyimide, etc. Also, in the case of using a thermal head as means for applying heat to the thermal transfer material, the surface of the support to contact the thermal head can be provided with a heat-resistant protective layer comprising a silicone resin, a fluorine-containing resin, a polyimide resin, an epoxy resin, a phenolic resin, a melamine resin or nitrocellulose to improve the heat resistance of the support. Alternatively, a support material which could not be used in the prior art can also be used by provision of such a protective layer.

The support 2 should preferably have a thickness desirably of about 1 to 15 microns, when a thermal head is used as a heating source during heat transfer. However, the thickness is not particularly limited when a heating source capable of selectively heating the heat-transferable ink layer such as laser beam is used.

In order to leave less trace of correction when an error recorded image is erased by lift-off correction, it is preferred that the ink layer has a structure as shown in FIG. 2, which comprises four or more ink layers and comprises an ink layer (e.g., the fourth ink layer 52 in FIG. 2) containing no or a very small amount of a colorant at the top of the thermal transfer material.

However, even in the case of the thermal transfer material including an ink layer having a four-layer structure, when a recording medium to be used has an extremely low surface smoothness (while also depending on the quality of the recording medium) the convexities of the recording medium sometimes penetrate the transferred ink layer thereby to provide a transferred image having "white spots" which is dotted with the above-mentioned convexities. Further, in such case, because it is difficult to peel the recorded image formed in the concavity of the recording medium, a correction trace is liable to occur when the recorded image is erased by lift-off correction.

According to our investigation, it has been found that the above-mentioned white spots and the correction trace caused thereby are largely affected by the thickness of the support 2 and the thickness of the fourth ink layer 52.

More specifically, if the thickness of the support 2 is too small, a higher heat energy is supplied to the ink layer to excessively melt the ink layer. Accordingly, the convexities of the recording medium surface sometimes penetrate the third ink layer 51 containing a colorant and, when the ink layer is transferred to the recording medium, there is provided a transferred image with white spots which is dotted with the convexities of the recording medium. As a result, there is sometimes provided a recorded image having a low image density as a whole. Further, in such case, the third ink layer 5 containing the colorant tends to deeply enters the concavity of the recording medium surface. As a result, when the recorded image is intended to be erased by lift-off correction, the colorant disposed in the concavity of the recording medium surface cannot be removed clearly, whereby a correction residue occurs.

On the other hand, if the thickness of the support 2 is too large, only a lower heat energy is supplied to the ink layer, and the fourth ink layer 51 disposed most distant from the heating means is supplied with insufficient heat energy, whereby the difference between the heated portion and the non-heated portion becomes small. As a result, it becomes difficult to sharply cut the ink layer at the boundary between the heated and non-heated portions and unevenness in the form of whiskers sometimes occurs, i.e., the edge clearness of the transferred image deteriorates.

Further, if the thickness of the fourth ink layer 52 is too small, the convexities of the recording medium surface sometimes penetrate the third ink layer 51 and a transferred image with white spots tends to occur, whereby a transferred image with a low image density and a correction residue are liable to occur. If the fourth ink layer 52 is too thick, similarly as in the case of the thick support 2, the fourth ink layer 52 is supplied with insufficient heat energy and the edge clearness of the transferred image tends to deteriorate.

For the above-mentioned reason, the thickness of the support 2 may preferably be 7 microns or more and 12 microns or less. Further, the thickness of the fourth ink layer 52 may preferably be 4 microns or more and 9 microns or less.

The thermal transfer material 1 according to the present invention may be prepared by fusion blending or kneading optionally with an appropriate solvent, the above-mentioned heat-fusible material, colorant and other additives to be optionally added by means of a dispersing means such as an attritor to obtain an ink which is heat-fused or in the state of solutions or dispersions, applying the ink on the support 2 by means of an applicator, wire bar, etc., followed by drying, if desired.

Hereinbelow, there is described a thermal transfer recording method using the thermal transfer material according to the present invention, by referring to the case using a thermal transfer material 1 as shown in FIG. 1.

Figure 3:
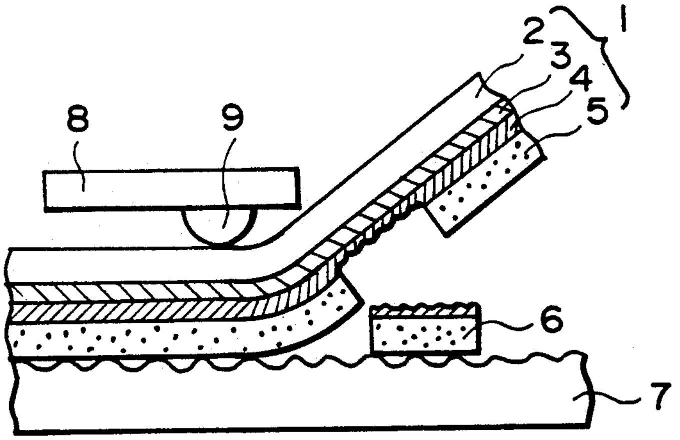
FIG. 3 is a schematic sectional view which illustrates a thermal transfer recording method using an embodiment of the thermal transfer material according to the present invention.

Referring to FIG. 3, the thermal transfer material 1 is superposed on a recording medium 7 so that the third ink layer 5 contacts or abuts on the recording medium 7, and a pattern of heat energy is applied to the thermal transfer material 1 from the support side by means of a heat-generating element 9 of a thermal head 8. The transfer material 1 is peeled from the recording medium 7 immediately after the transfer material is heated and before the strength of the second ink layer 4 becomes sufficiently large (preferably, after 20 msec or less, more preferably 10 msec or less, counted from the energy application).

Even under such heat energy application, the first ink layer 3 of the above-mentioned thermal transfer material 1 strongly adheres to the support 2 and is not transferred to the recording medium 7 side. However, the third ink layer 5 develops an adhesion to the recording medium 7 and is transferred to the recording medium 7 while retaining an appropriate film strength. Further, the heated portion of the second ink layer 4 is sharply melted and changed to a semiliquid or liquid state, and the melt viscosity thereof decreases, whereby the cohesion state in the second ink layer 4 can very easily be broken.

On the other hand, because the non-heated portion of the second ink layer 4 does not melt, it retains a high cohesion and a strong adhesion strength between the first ink layer 3 and the third ink layer 5. As a result, the adhesion contrast between the heated and non-heated portions becomes extremely clear, and the edge clearness of the resultant transferred image is enhanced. Further, the heat energy to be applied to the thermal transfer material can be reduced on the basis of the sharp-melting property of the second ink layer 4.

Next, there is described a correction or erasing method using the thermal transfer material according to the present invention.

Figure 4:
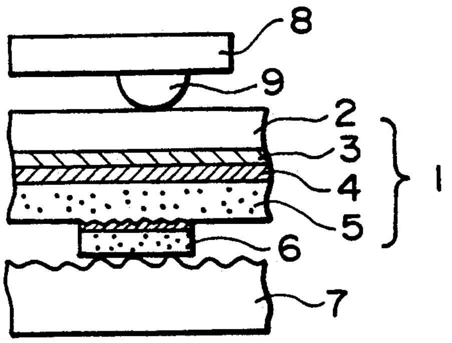
FIGS. 4 and 5 are schematic sectional views each illustrating a lift-off correction method using the thermal transfer material according to the present invention.

Referring to FIG. 4, there is formed a transferred recorded image 6 on a recording medium 7 by using the thermal transfer material 1 of the present invention. The thermal transfer material 1 is superposed on the recording medium 7 so that the third ink layer 5 contacts or abuts on the transferred image 6, and a heat energy is applied to a portion of the thermal transfer material 1 corresponding to that equal to or larger than the transferred image 6, from the support 2 side thereof by means of a heat-generating element 9 of a thermal head 8. At this time, the third ink layer 5 of the thermal transfer material 1 develops an adhesion in the same manner as in the above-mentioned recording and adheres to the transferred image 6 on the recording medium 7. Further, the cohesion in the second ink layer 4 of the thermal transfer material 1 decreases.

Figure 5:
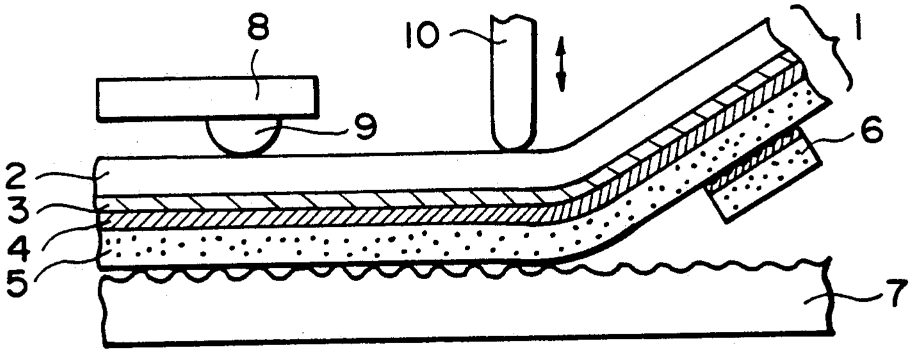

However, in the present invention, the thermal transfer material 1 is peeled from the recording medium 7 after the strength of the above-mentioned second ink layer 4 (i.e., the adhesion between the first ink layer 3 and the third ink layer 5 and the cohesion in the second ink layer 4) recovers (preferably, after 50 msec or more, more preferably 100 msec or more, counted from the energy application), e.g., by protruding a peeling control member 10 for controlling the peeling of the thermal transfer material 1 from the recording medium 7, toward the recording medium 7 as shown in FIG. 5. At this time, the adhesion between the third ink layer 5 and the transferred image 6 also increases and the lift-off correction of the transferred image 6 is attained by using the above-mentioned thermal transfer material 1.

Hereinbelow, the present invention will be explained in further detail with reference to Examples. Incidentally, the weight ratios appearing hereinafter are those based on solid contents.

EXAMPLE 1

A 6 micron-thick polyethylene terephthalate film was coated with an emulsion (non-volatile content =40%) of vinyl acetate-ethylene copolymer resin (glass transition temperature (Tg)=0° C., weight-average molecular weight (Mw)=779000, ethylene content=20%) by means of an applicator, followed by drying for 1 min. in a hot air drier at 80° C. to form a 2.0 micron-thick first ink layer.

| (Prescription 1) | |
|---|---|
| Carnauba wax | 26.0 parts |
| Surfactant (polyoxyethylene lauryl ether) | 4.0 parts |
| Water | 70.0 parts |

An aqueous dispersion according to the above Prescription 1 was diluted with 100 parts of water and then was applied onto the first ink layer formed above by means of an applicator, followed by drying for 1 min. in a hot air drier at 60° C. to form a 1.5 micron-thick second ink layer. The second ink layer had a melting point of 80° C. and a melt viscosity of 20 cps at 150° C.

| (Prescription 2) | |
|---|---|
| Ethylene-vinyl acetate copolymer emulsion (non-volatile content = 25%, base resin: MI (melt index) = 15, vinyl acetate content = 28%) | 35 parts |
| Ethylene-methacrylic acid-styrene copolymer emulsion (non-volatile content = 25%, ethylene content = 88%) | 20 parts |
| Vinyl acetate-ethylene copolymer emulsion (non-volatile content = 25%, base-resin: vinyl acetate content = 86%) | 30 parts |
| Carbon black aqueous dispersion | 15 parts |

The components of the above Prescription 2 were mixed uniformly by means of a propeller-type stirrer to prepare a coating liquid 2.

The coating liquid 2 was applied onto the second ink layer formed above by means of an applicator, and dried at 60° C. for 1 min. by hot-air, to form a 3.5 micron-thick third ink layer, whereby a thermal transfer material (I) according to the present invention was obtained.

Example 2

| | |
|---|---|
| (Prescription 3) | |
| Ethylene-vinyl acetate copolymer emulsion (non-volatile content = 25%, base resin: MI = 6, vinyl acetate content = 28%) | 40 parts |
| Urethane resin emulsion (non-volatile content = 25%, softening point = 180° C.) | 5 parts |
| Vinyl acetate-ethylene copolymer emulsion (non-volatile content = 25%, base-resin: vinyl acetate content = 86%) | 15 parts |
| Carbon black aqueous dispersion | 40 parts |
| (Prescription 4) | |
| Ethylene-vinyl acetate copolymer emulsion (non-volatile content = 25%, base resin: MI = 15, vinyl acetate content = 28%) | 45 parts |
| Ethylene-methacrylic acid-styrene copolymer emulsion (non-volatile content = 25%, ethylene content = 88%) | 25 parts |
| Vinyl acetate-ethylene copolymer emulsion (non-volatile content = 25%, base-resin: vinyl acetate content = 86%) | 30 parts |

The components of the above Prescription 3 and those of the Prescription 4 were respectively mixed uniformly by means of a propeller-type stirrer to prepare a coating liquid 3 and a coating liquid 4, respectively.

Separately, a first ink layer and a second ink layer were formed on a support film in the same manner as in Example 1. Then, the coating liquid 3 was applied onto the second ink layer formed above by means of an applicator, and dried at 60° C. for 1 min. by hot-air, to form a 1.5 micron-thick third ink layer. Then, the coating liquid 4 was applied onto the third ink layer by means of an applicator, and dried at 60° C. for 1 min. by hot-air, to form a 1.7 micron-thick fourth ink layer, whereby a thermal transfer material (II) according to the present invention was obtained.

EXAMPLE 3

| (Prescription 5) | |
|---|---|
| Oxidized polyethylene (number-average molecular weight: 1450) | 40 parts |
| Rhodinic acid (1-phenanthrenecarboxylic acid, 1, 2, 3, 4, 4A, 9, 10, 10A-octahydro-1, 4A-dimethyl-7-(1-methylethyl)-) | 10 parts |
| Amine (triethanolamine) | 5 parts |
| Water | 160 parts |

The component of the above Prescription 5 were emulsified under heating and pressure to prepare a 25% oxidized polyethylene emulsion.

A thermal transfer material (III) was prepared in the same manner as in Example 1 except that the above prepared emulsion according to the Prescription 5 was used instead of the dispersion according to Prescription 1 used in Example 1. The second ink layer had a melting point of 100° C. and a melt viscosity of 120 cps at 150° C.

EXAMPLE 4

| (Prescription 6) | |
|---|---|
| Oxidized polyethylene (number-average molecular weight: 5000) | 40 parts |
| Polyoxyethylene nonylphenyl ether (mole of addition ethylene oxide: 9-11 mole) | 10 parts |
| Potassium hydroxide | 0.9 part |
| Ethylene glycol | 1.7 parts |
| Water | 158 parts |

The component of the above Prescription 6 emulsified under heating and pressure to prepare a 25% oxidized polyethylene emulsion.

A thermal transfer material (IV) was prepared in the same manner as in Example 1 except that the above prepared emulsion according to the Prescription 6 was used instead of the dispersion according to Prescription 1 used in Example 1. The second ink layer had a melting point of 130° C. and a melt viscosity of 5500 cps at 150° C.

COMPARATIVE EXAMPLE 1

A thermal transfer material (V) was prepared in the same manner as in Example 1 except that the above-mentioned first ink layer formed in Example 1 was not formed.

COMPARATIVE EXAMPLE 2

A thermal transfer material (VI) was prepared in the same manner as in Example 3 except that the above-mentioned first ink layer formed in Example 3 was not formed.

COMPARATIVE EXAMPLE 3

A thermal transfer material (VII) was prepared in the same manner as in Example 2 except that the above-mentioned first ink layer formed in Example 2 was not formed, and the second ink layer was formed according to Prescription 5 used in Example 3.

Then, the seven kinds of thermal transfer materials obtained in the above Examples and Comparative Examples were respectively slit into 8 mm-wide ribbon, and recording and lift-off correction were effected on two recording media, i.e., bond paper having a low surface smoothness (Bekk smoothness 2-3 sec) and paper adapted to thermal transfer having a high surface smoothness (Bekk smoothness 200 sec), by means of a thermal printer (trade name: Electronic Typewriter SP400X, mfd. by Canon K.K.). Thus, the recording and lift-off correction characteristics were evaluated.

Incidentally, in the above-mentioned typewriter SP400X, a heater is incorporated in the thermal head in order to heat a thermal transfer material up to a temperature higher than room temperature prior to a recording operation. However, in this evaluation, the above-mentioned heater was not energized. Further, the lift-off correction characteristic was evaluated by loading the above-mentioned thermal transfer materials (I)-(VII), respectively, in the storage part of the typewriter SP 400X for storing a heat-sensitive correction tape.

The results are shown in the following Table 1.

TABLE 1

| Thermal transfer material | Printing: Bond paper | Printing: Thermal transfer paper | Correction: Bond paper | Correction: Thermal transfer paper |
|---|---|---|---|---|
| (I) | a | a | a | a |
| (II) | a | a | a | a |
| (III) | a | a | a | a |
| (IV) | b | a | a | a |
| (V) | c | c | c | c |
| (VI) | c | c | c | c |
| (VII) | a | a | c | c |

In the above Table 1, the symbols have the following meanings.

a (Printing): The recorded image showed good edge clearness (i.e., the edge portion of the recorded image corresponded to the heated portion).

(Correction): Most of the recorded image could be removed by lift-off correction and the trace of the correction was practically of no problem.

b (Printing): The recorded image became thinner, but was practically usable.

(Correction): Most of the recorded image could be removed by lift-off correction, but reverse transfer partially occurred. The correction trace was hardly discernible.

c (Printing): The recorded image became thicker and was poor in edge clearness.

(Correction): Reverse transfer occurred and the recorded image completely remained on the recording medium.

EXAMPLE 5

Five species of polyethylene terephthalate films as shown in Table 2 appearing hereinafter were respectively coated with an emulsion (non-volatile content=40%) of vinyl acetate-ethylene copolymer resin (glass transition temperature (Tg)=0° C., weight-average molecular weight (Mw)=779000, ethylene content=20%) by means of an applicator, followed by drying for 1 min. in a hot air drier at 80° C. to form a 1.0 micron-thick first ink layer.

The above-mentioned aqueous dispersion according to Prescription 1 used in Example 1 was diluted with 100 parts of water and then was applied onto each of the first ink layers formed above by means of an applicator, followed by drying for 1 min. in a hot air drier at 60° C. to form a 1.0 micron-thick second ink layer.

| (Prescription 7) | |
|---|---|
| Alkyl acrylates copolymer emulsion (Acronal YJ-8501D supplied from Mitsubishi Yuka Badische K.K., non-volatile content = 55%) | 19 parts |
| Carbon black aqueous dispersion (non-volatile content = 25%) | 18 parts |
| Water | 63 parts |

The components of the Prescription 7 were mixed uniformly by means of a propeller-type stirrer to prepare a coating liquid 7.

The coating liquid 7 was applied onto each second ink layer formed above by means of an applicator, and dried at 60° C. for 1 min. by hot-air, to form a 1.5 micron-thick third ink layer.

| (Prescription 8) | |
|---|---|
| Ethylene-vinyl acetate copolymer emulsion (non-volatile content = 44%, base resin: MI = 150, vinyl acetate content = 28%) | 54.5 parts |
| Ethylene-methacrylic acid-styrene copolymer emulsion (non-volatile content = 25%, ethylene content = 88%) | 32 parts |
| water | 13.5 parts |

The components of the above Prescription 8 were mixed uniformly in the same manner as in Prescription 7 to prepare a coating liquid 8.

The coating liquid 8 was applied onto each of the above-mentioned third ink layers formed above by means of an applicator and dried to form fourth ink layers each having a thickness as shown in Table 2 appearing hereinafter, whereby 25 species of thermal transfer materials according to the present invention were obtained.

Then, the 25 kinds of thermal transfer materials obtained in the above Example 5 were respectively slit into 8 mm-wide ribbon, and recording and lift-off correction were effected on bond paper having a low surface smoothness (Bekk smoothness 2-3 sec) by means of a thermal printer (trade name: Electronic Typewriter SP400X, mfd. by Canon K.K.). Thus, the recording and lift-off correction characteristics were evaluated in the same manner as in the case of the thermal transfer materials (I)-(VII).

The results are shown in the following Table 2.

TABLE 2

| Thickness of fourth ink layer | Thickness of support: 6 μm | 7 μm | 9 μm | 12 μm | 15 μm |
|---|---|---|---|---|---|
| 3 μm | D | B | A | A | A |
| | D | D | D | D | D |
| 4 μm | D | B | A | A | C |
| | D | B | B | A | A |
| 5 μm | D | B | A | A | C |
| | D | B | A | A | A |
| 9 μm | D | B | A | B | C |
| | D | A | A | A | A |
| 10 μm | B | C | C | C | C |
| | D | A | A | A | A |

In the above Table 2, the upper symbol denotes printing performance and the lower symbol denotes correction performance, with respect to the respective thicknesses.

In the above Table 2, the symbols have the following meanings.

A (Printing): The recorded image showed good edge clearness, and white spots were very few.

(Correction): Substantially no correction residue was observed.

B (Printing): Somewhat white spots were observed, but edge clearness of the recorded image was good and was practically no problem.

(Correction): Lift-off correction of the recorded image was possible, but correction residue slightly remained on the periphery of convexities of the recording medium. The correction trace was not discernible.

C: White spots were very few but the recorded image became somewhat thinner.

D (Printing): The edge clearness of the recorded image was good but a large number of white spots were observed.

(Correction): Lift-off correction of the recorded image was possible, but correction residue remained on the periphery of convexities of the recording medium. The correction trace was sometimes discernible.

EXAMPLE 6

A 2.0 micron-thick first ink layer was formed in the same manner as in Example 1 by using an emulsion containing a vinyl acetate-ethylene copolymer resin (glass transition temp. = −18° C., weight-average molecular weight = 1,000,000, ethylene content = 35%), and second and third ink layers were formed in the same manner as in Example 1, thereby to prepare a thermal transfer material (VIII).

EXAMPLE 7

A 2.0 micron-thick first ink layer was formed in the same manner as in Example 1 by using an emulsion containing an acrylic resin (glass transition temp. = 7 ° C., Acronal YJ-1600D supplied from Mitsubishi Yuka Badische K.K.), and second and third ink layers were formed in the same manner as in Example 1, thereby to prepare a thermal transfer material (IX).

EXAMPLE 8

A 2.0 micron-thick first ink layer was formed in the same manner as in Example 1 by using an emulsion containing an acrylic resin (glass transition temp. = 15° C., Acronal YJ-1560D supplied from Mitsubishi Yuka Badische K.K.), and second and third ink layers were formed in the same manner as in Example 1, thereby to prepare a thermal transfer material (X).

The thermal transfer materials (VIII)-(X) obtained in the above Examples 6-8 were evaluated in the same manner as in the case of the thermal transfer materials (I)-(VII) obtained in Examples 1-4 and Comparative Examples 1-3. The results are shown in the following Table 3.

TABLE 3

| Thermal transfer material | Printing: Bond paper | Printing: Thermal transfer paper | Correction: Bond paper | Correction: Thermal transfer paper |
|---|---|---|---|---|
| (VIII) | a | a | a | a |
| (IX) | a | a | a | a |
| (X) | a | a | b | b |

The symbols in the above Table 3 are the same as in Table 1.

As described hereinabove, according to the present invention, there is provided a thermal transfer material which comprises at least a support, and a first link layer, a second ink layer and a third ink layer disposed thereon in this order. The first ink layer strongly adheres to the support even at the time of printing, the second ink layer has a function of providing a printing image by separation, and the third ink layer predominantly comprises a thermoplastic resin.

By using such thermal transfer material, a transfer-recorded image with good image quality is obtained not only on a recording medium with a high surface smoothness but also on a recording medium with a low surface smoothness. Further, the transferred image may be erased by lift-off correction by using the above-mentioned thermal transfer material.

Particularly, it is preferred that the thermal transfer material comprises at least a fourth ink layer in addition to the first, second and third ink layers disposed on the support, the support has a thickness of 7-12 microns, and the fourth ink layer has a thickness of 4-9 microns, in order to effect printing and correction (or erasure) without a white spot in the recorded image or without correction residue.

What is claimed is:

1. A transfer recording method for printing indicia and for performing lift-off correction comprising:

(a) providing a self-correcting thermal transfer material which comprises a support, a first layer, a second layer and a third layer disposed in this order on the support, wherein said first layer comprises a thermoplastic resin having a glass transition temperature of −40° to 30° C., and is a substantially nontransferble layer having a melt viscosity of at least 5000 cps at 150° C. and is capable of adhering to the support on heating and lift-off correction, said second layer being a peelable layer having a melt viscosity of no greater than 500 cps at 150° C., wherein said peelable layer is more adhesive to the first layer than to the support, and at least said third layer containing a colorant;

(b) superposing the transfer material on a recording medium so that the third layer is closer than the support to the recording medium;

(c) heating the transfer material in a pattern to cause a reduction in the cohesive strength of the second layer;

(d) separating the transfer material from the recording medium immediately after the transfer material is heated and before the cohesive strength of the second layer is restored, to thereby separate the third layer from the first layer and to leave a recorded image on the recording medium without substantially transferring the first layer;

(e) causing the transfer material to adhere to the recorded image under heating, said heating causing a reduction in the cohesive strength of the second layer; and (f) separating the transfer material from the recording medium after the cohesive strength of the second layer is sufficiently restored without causing separation of the second layer and without substantially transferring the first layer, to thereby peel the recorded image from the recording medium toward the transfer material.

2. A thermal transfer recording method according to claim 1, wherein said first layer comprises 70-100% by weight of said thermoplastic resin.

3. A thermal transfer recording method according to claim 2, wherein said first layer comprises 90-100% by weight of second said thermoplastic resin.

4. A thermal transfer recording method according to claim 2, wherein said thermoplastic resin has a weight-average molecular weight of 10,000 or higher.

5. A thermal transfer recording method according to claim 4, wherein said thermoplastic resin has a weight-average molecular weight of 50,000 or higher.

6. A thermal transfer recording method according to claim 1, wherein said thermoplastic resin has a glass transition temperature of −30° to 15° C.

7. A thermal transfer recording method according to claim 6, wherein said thermoplastic resin has a glass transition temperature of −18° to 15° C.

8. A thermal transfer recording method according to claim 1, wherein said second layer has a melting point of 50° C. or above.

9. A thermal transfer recording method according to claim 8, wherein said second layer has a melt viscosity of 200 cps or below at 150° C.

10. A thermal transfer recording method according to claim 9, wherein said second layer has a melt viscosity of 100 cps or below at 150° C.

11. A thermal transfer recording method according to claim 1, wherein said second layer comprises 80% by weight or more of a wax.

12. A thermal transfer recording method according to claim 11, wherein said second layer comprises 90% by weight or more of a wax.

13. A thermal transfer recording method according to claim 1, wherein said third layer comprises 50% by weight or more of a second thermoplastic resin.

14. A thermal transfer recording method according to claim 13, wherein said third layer comprises 70% by weight or more of said second thermoplastic resin.

15. A thermal transfer recording method according to claim 1, wherein said third layer has a melt viscosity of 600 cps or above at 150° C.

16. A thermal transfer recording method according to claim 15, wherein said third layer has a melt viscosity of 1000 cps or above at 150° C.

17. A thermal transfer recording method according to claim 16, wherein said third layer has a melt viscosity of 5000 cps or above at 150° C.

18. A thermal transfer recording method according to claim 1, wherein said third layer contains 5–60% by weight of a colorant.

19. A thermal transfer recording method according to claim 1, wherein said third layer has a two-layer structure comprising a lower layer containing 3 to 80 weight percent of said colorant based on the weight of the lower layer which is closer to the support, and an upper layer containing zero to less than 3 weight percent of said colorant based on the weight of the upper layer which is further from the support.

20. A thermal transfer recording method according to claim 19, wherein said support has a thickness of 7–12 microns and said upper layer has a thickness of 4–9 microns.

* * * * *

UNITED STATES PATENT AND TRADEMARK OFFICE

CERTIFICATE OF CORRECTION

PATENT NO. : 5,269,865

DATED : December 14, 1993

INVENTOR(S) : NAOKI KUSHIDA, ET AL.

It is certified that error appears in the above-identified patent and that said Letters Patent is hereby corrected as shown below:

<u>COLUMN 1</u>

Line 37, "correcting" should read --correction--.
Line 41, "correcting" should read --correction--.

<u>COLUMN 6</u>

Line 7, "for" should read --that--.
Line 30, "Example" should read --Examples--.
Line 36, "wax-" should read --wax,--.
Line 37, ",and" should read --and--.
Line 41, "constitutes" should read --constitute--.
Line 51, "constitutes" should read --constitute--.

<u>COLUMN 8</u>

Line 27, "CGG<Kayaset" should read --CGG, Kayaset--.

<u>COLUMN 10</u>

Line 39, "enters" should read --enter--.

<u>COLUMN 13</u>

Line 4, "Example 2" should read --EXAMPLE 2--.
Line 61, "component" should read --components--.

<u>COLUMN 14</u>

Line 16, "component" should read --components-- and "emulsi-" should read --were emulsi- --.

UNITED STATES PATENT AND TRADEMARK OFFICE
CERTIFICATE OF CORRECTION

PATENT NO. : 5,269,865

DATED : December 14, 1993

INVENTOR(S) : NAOKI KUSHIDA, ET AL.

It is certified that error appears in the above-identified patent and that said Letters Patent is hereby corrected as shown below:

COLUMN 18

Line 59, "second" should be deleted.

Signed and Sealed this

Nineteenth Day of July, 1994

Attest:

BRUCE LEHMAN

Attesting Officer

Commissioner of Patents and Trademarks